Figure 1:
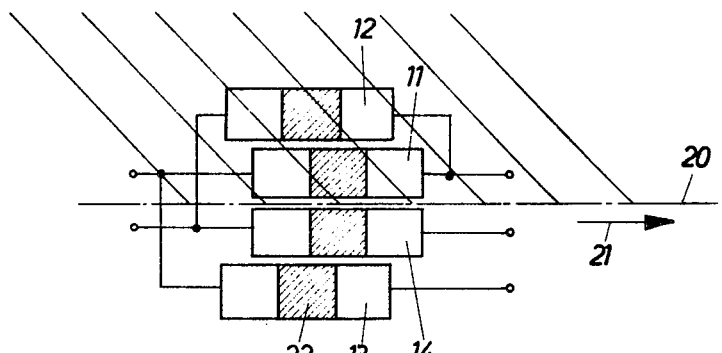

United States Patent

[11] 3,604,937

| [72] | Inventor | Gunter Hahn |
| | | Hausen, Germany |
| [21] | Appl. No. | 832,909 |
| [22] | Filed | June 13, 1969 |
| [45] | Patented | Sept. 14, 1971 |
| [73] | Assignee | Messer Griesheim GmbH |
| | | Frankfurt/Main, Germany |
| [32] | Priority | June 15, 1968 |
| [33] | | Germany |
| [31] | | P 17 63 516.4 |

[54] DEVICE FOR DETECTING EDGES OR A PATTERN BY PHOTOELECTRIC MEANS
8 Claims, 2 Drawing Figs.

| [52] | U.S. Cl. ...................................... | 250/202, 250/209, 250/210, 250/220 |
| [51] | Int. Cl. ...................................... | G05b 1/00 |
| [50] | Field of Search ........................... | 250/202, 209, 210, 220 |

[56] References Cited

UNITED STATES PATENTS

| 3,333,105 | 7/1967 | Kassakowski ................ | 250/210 |
| 3,427,457 | 2/1969 | Domenico ..................... | 250/210 X |
| 3,475,617 | 10/1969 | Chaimowicz ................ | 250/239 |

FOREIGN PATENTS

| 987,718 | 3/1965 | Great Britain ................ | 250/202 |

Primary Examiner—James W. Lawrence
Assistant Examiner—D. C. Nelms
Attorney—Ernest F. Marmorek

ABSTRACT: In an apparatus for photoelectrically following up an edge portion or a pattern for controlling a processing machine such as a cutting apparatus, a bridge circuit comprising at least four branches having a light-sensitive resistor included in each of the branches, one pair of the light-sensitive resistors being disposed on a dark region on one side of the edge portion or pattern, another pair of the light-sensitive resistors being disposed on a bright region on the other side of the edge portion or pattern, the light-sensitive resistors having similar characteristics.

PATENTED SEP 14 1971 3,604,937

INVENTOR:
Günter Hahn,
BY
His Attorney.

DEVICE FOR DETECTING EDGES OR A PATTERN BY PHOTOELECTRIC MEANS

The present invention relates generally to an apparatus for the detection of edges or the followup of master plates or patterns by photoelectric means in controlling the followup operation of processing machines, such as acetylene or torch cutting machines, and in which the photoelectric means are photosensitive devices arranged in an electrical bridge circuit.

In the field of photoelectric detection of patterns which are in the form of master plates or drawings, it is a common practice to use photocells, photoresistors, or photoelectric semiconductors known as light sensors. In a simple case such light sensor forms a branch of an electrical bridge while the other branches consist of ohmic resistors. The diagonal voltage of this bridge is then fed through an appropriate amplifier device which in turn drives electromotorical, hydraulic or pneumatic devices which in turn rotate the light sensor about an axis perpendicular to the master plate during its relative movement until the diagonal voltage of the bridge becomes zero, that is, until the bridge is balanced. This state of balance is obtained when a certain light quantity becomes incident on the light sensor. Should such arrangement follow the contour of a black-and-white pattern or drawing, then the bridge balance is obtained when the image of the black-and-white region is centrally located on the light sensor. Such state can be attained if the following conditions are met: appropriate dimensioning of the other bridge components, if the intensity of illumination of the copied pattern remains constant from its sides, if the bright/dark characteristics of the pattern remain constant and, if the internal resistance of the light sensor remains unaffected by temperature changes.

Such requirements, however, cannot be met under practical conditions. The illuminating intensity of the pattern usually changes due to variations of the line voltage, to changing conditions of the pattern-illuminating devices and, to the general illumination conditions (outside light) which depend upon the place of operation. The bright/dark relation of the pattern varies, for instance, as a result of contamination or yellowing of the pattern itself. Also, as not the least significant factor, the semiconductor light sensors possess a considerably high temperature coefficient. The latter will lead to an upsetting of the bridge balance due to the changes in the environmental temperatures, which in turn leads to reduced sensitivity of the device.

The above problems are not encountered during the copying of lines. Here usually two light sensors are used which form a resistor pair in an electrical bridge circuit and, which under balanced conditions of the bridge are positioned on both sides of the line to be copied and each in the bright region. It becomes obvious that under such arrangement the pair of light sensors cannot effect the bridge balance under the above-described environmental conditions since both light sensors react to such conditions in a similar manner. Therefore, the balance of the bridge will be retained.

An attempt has been made to use such followup or copying device having a pair of light sensors in an operation involving the copying or followup of edges or master plates. The axis of s symmetry between bright and dark regions. Naturally, under these conditions and, at the balanced state of the bridge in contrast to the line-copying operation, one of the light sensors is in the dark region and the other is in the bright region. As a result, the light sensor located in the dark region exhibits a very high ohmic condition with respect to the other. Should now the above-described environmental changes and affects appear, the internal resistance of the light sensor operating under high ohmic conditions will sharply increase while the internal resistance of the light sensor operating under low ohmic conditions experiences only relatively minor changes. This phenomenon can be explained by the fact that the characteristics (internal resistance in terms of light intensity) of such light sensors is not linear but follows a rather hyperbolalike curve. As a result, the bridge balance is upset which, in turn, results in followup errors of the device.

It has been also found that the light sensors described above are characterized by greatly varying time constants at large variations of the internal resistances. Such characteristics would make themselves apparent when the above-described line-copying device is used for the followup of edges with right-turning curves, which could be copied normally, while the left-turning curves would be copied with errors which are explainable by the respectively higher or sluggish sensitivity of the device under the different conditions associated with each curve.

It is, therefore, an object of the present invention to provide a followup or copying device of the above-described type in which the balanced condition of the bridge is not effected by the above-described extrinsic or environmental conditions.

In accordance with the invention and with a view of the above object, the four resistors of the bridge circuit which are arranged in pairs in the respective halves of the bridge, are all light sensors and one of the resistor pairs is located in the dark region while the other of the resistor pairs is located in the bright region of the master plate or form to be copied.

According to the invention, a simultaneous change of the characteristics of the four light sensors caused by temperature change will not result in a change of the diagonal voltage fed to the amplifier due to the symmetrical bridge construction. The same is true for the appearance of an extrinsic light falling on the master plate or pattern to be copied, such as for instance, the unexpected incidence of sunlight. Under these conditions, the resistance of each light sensor arranged in pairs changes in a similar manner to a similar extent, therefore, the diagonal voltage of the bridge remains unaffected. The same is true for the compensation of contrast variations in the bright or dark regions of the master plate, under which conditions the resistance of the light sensors arranged in the respective pairs changes similarly which, again, will not effect the balance of the bridge.

As pointed out above, the invention finds its primary application in the copying of edges on master plates. The device according to the invention is, however, applicable just as well to the copying of lines. The latter operation can be performed in a simple fashion by turning off the two outside light sensors and retaining the both inside sensors for the copying of the line in a known manner. In practice, it has been found that the light-sensitive portions of the light sensors should be made narrow and not wider than 1 mm. In copying lines from drawings which range normally from 0.5 mm. to 0.8 mm. in width, a practical image ratio of about 1:1 will result and, under equally masked copying conditions, both inner light sensors will be covered half way when the distance between them is chosen negligibly small. The upsetting of the balanced condition of the bridge under these conditions will occur in a desired optimum fashion.

The invention provides also for a secure insulation of and for the smallest and well-defined distances between the light sensors by the use of a synthetic resin for spacing, which at a thickness ranging from 5 micrometers through 50 micrometers proved to be most preferable. If the accuracy requirements are less stringent, a synthetic resin covering of adjacent sensors can be had according to the invention.

Figure 2:
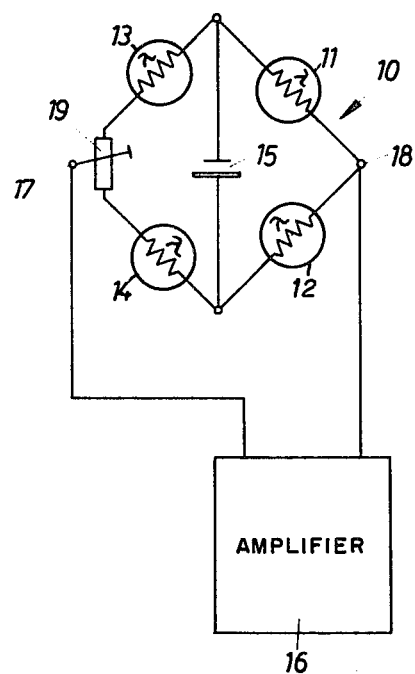

In accordance with another feature of the invention, the inside light sensors are displaced forwardly along the direction of movement of the master plate by a distance corresponding to one half of the width of the light-sensitive surface of the sensors. Such combination is advantageous in order to receive an accurate signal on the bridge representing the rotation of the copying device when curves at right or acute angles are to be copied. The invention will become more readily apparent from the following description of a preferred embodiment thereof shown, by way of example, in the accompanying drawing in which:

FIG. 1 is a schematic representation of the light sensor arrangement with respect to and edge to be copied under balance bridge conditions according to the invention; and FIG. 2 is a diagrammatic representation of the bridge circuit with the light sensors therein according to the invention.

With reference to the FIGS. particularly to FIG. 2, it is seen that bridge circuit 10 contains four resistors 11, 12, 13 and 14 of the light sensor type each of which being placed in a respective branch of the bridge. The bridge is fed through a supply source 15. The diagonal or output voltage of the bridge circuit 10 is fed to amplifier device 16 and it is taken off at the diagonal terminals identified by 17 and 18. When an output voltage is produced at terminals 17 and 18 and is fed to amplifier 16, the latter produces a corresponding control signal which in turn drives a motor (not shown in the drawing) which positions the light sensors. The bridge circuit is in balanced condition when no output voltage appears at terminals 17 and 18. Such balanced condition under which the amplifier device 16 receives no input, that is, no control signal is given to the light-sensor-positioning motor, can be set to a defined value by an adjusting resistor 19.

As further can be seen in FIGS. 1 and 2 of the drawing, the light sensors 11, 12 and light sensors 13, 14 are arranged in a pair (resistor pair) in a respective half of the bridge circuit. The light sensor pair comprising sensors 11, 12 is placed in the dark region represented by the shaded portion in FIG. 1 and the light sensor pair comprising sensors 13 and 14 is placed in the bright region of the master plate or form having an edge to be copied. At the symmetrical positioning of both light sensor pairs with respect to the bright/dark border, as seen in FIG. 1 (which is the edge to be copied itself), the bridge is in balanced condition. A sidewise movement or displacement of the bright/dark border with respect to the light sensor pairs results in a signal voltage at amplifier 16, which, in turn produces a corrective movement until the axial symmetry is attained again.

As seen in FIG. 1, both inside or inner light sensors 11, 14 are displaced forwardly along the direction of feed identified by arrow 21. The forward displacement corresponds to about half the length of the light-sensitive surface of the light sensors identified by the reference character 22 and, shown in a shaded fashion, Such configuration is necessary in case curves at right or acute angles are copied in order to provide a bridge signal corresponding to the turning of the copying device. If light sensors 11 and 12 in FIG. 1 had not been forwardly displaced, a left-directed curve having a right angle could not be followed up, since both light sensors with their fronts would simultaneously enter the bright region. According to the inventive forward displacement of the inside sensors, such turn will not disturb the bridge balance since no signal will be produced on the bridge which would upset the balance at a sharp left turn. When the light sensor 11 is forward then on a sharp turn first the light-sensitive portion 22 of sensor 11 will enter the bright region and the bridge produces a signal on the amplifier 16 corresponding to the movement.

From the above it will be apparent that this invention provides a novel edge or pattern-copying or followup apparatus which fulfills all of the objects for the invention. While the invention has been shown and described with reference to a preferred embodiment thereof, of course it will be obvious to those skilled in the art that the invention will find applications in connection with many types of apparatus other than that shown. Thus it will be apparent that the invention is not to be considered as limited by the drawing and description but only as to its spirit and scope as it is set forth in the appended claims.

I claim:

1. In an apparatus for photoelectrically following up an edge portion or a pattern for controlling a processing machine such as a cutting apparatus, a bridge circuit means comprising at least four branches having a light-sensitive resistor means included in each of said branches, one pair of said light-sensitive resistor means being disposed on a dark region on one side of said edge portion or said pattern, another pair of said light-sensitive resistor means being disposed on a bright region on the other side of said edge portion or said pattern, said light-sensitive resistor means having similar characteristics whereby during a change in the contour of said edge portion or pattern only one of said pairs of light-sensitive resistor means supplies a signal.

2. In an apparatus for photoelectrically following up an edge portion or a pattern for controlling a processing machine such as a cutting apparatus, a bridge circuit means comprising at least four branches having a light-sensitive resistor means included in each of said branches, one pair of said light-sensitive resistor means being disposed on a dark region on one side of said edge portion or said pattern, another pair of said light-sensitive resistor means being disposed on a bright region on the other side of said edge portion or said pattern, said light-sensitive resistor means having similar characteristics, wherein one of each of said pairs of light-sensitive resistor means form an inner pair nearer to said edge portion or pattern, and the other one of each of said pairs of light-sensitive resistor means form an outer pair, each of said light-sensitive resistor means having a light-sensitive surface of predetermined length and width, said inner pair of said sensitive resistor means being displaced in the direction of feed with respect to said outer pair by a distance corresponding to about half of said predetermined length.

3. The combination as claimed in claim 2, wherein said bridge circuit includes a variable null resistor means.

4. The combination as claimed in claim 2, wherein said length and width are less than 2 mm. in size.

5. The combination as claimed in claim 2, wherein said length and width are less than 1 mm. in size.

6. The combination as claimed in claim 1, wherein said light-sensitive resistor means are insulated from each other by a preferably chemically neutral synthetic resin film.

7. The combination as claimed in claim 1, wherein said light-sensitive resistor means are insulated from each other by a preferably chemically neutral hardenable synthetic resin.

8. The combination as claimed in claim 2, wherein said outer pair of light-sensitive resistor means is capable of being turned off while said inner pair is in an actuated state.